J. H. KLINCK.
CONTROL SYSTEM FOR ELECTRIC MOTORS.
APPLICATION FILED JAN. 26, 1910.
1,074,874.
Patented Oct. 7, 1913.
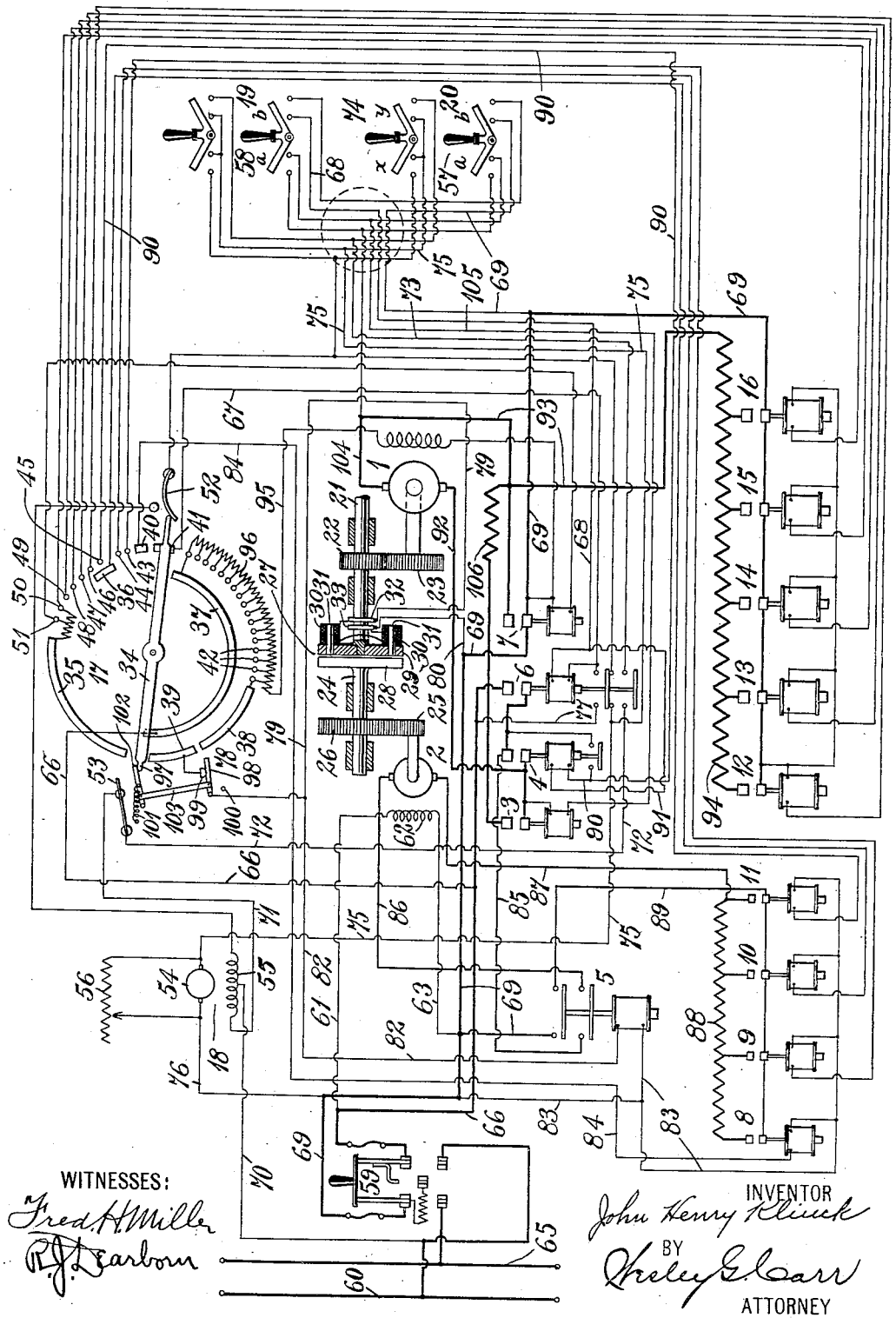
WITNESSES:
Fred H Miller
R. J. Dearborn
INVENTOR
John Henry Klinck
BY
Wesley G Carr
ATTORNEY
COLUMBIA PLANOGRAPH CO., WASHINGTON, D. C.

UNITED STATES PATENT OFFICE.

JOHN H. KLINCK, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR ELECTRIC MOTORS.

1,074,874. Specification of Letters Patent. Patented Oct. 7, 1913.

Application filed January 26, 1910. Serial No. 540,212.

*To all whom it may concern:*

Be it known that I, JOHN H. KLINCK, a citizen of the United States, and a resident of Pittsburgh, in the county of Allegheny and State of Pennsylvania, have invented a new and useful Improvement in Control Systems for Electric Motors, of which the following is a specification.

My invention relates to systems of electric motor control and it has for its object to provide an automatic system for governing a plurality of motors to obtain a relatively wide variation in the speed of the machine or device to which they are operatively connected.

It has been proposed to utilize two or more electric motors for driving printing presses and similar apparatus requiring a wide speed variation, the motors being connected to the machine by low speed and high speed gears and operated successively. By arranging the motors in this way, it is possible to efficiently operate the printing press or other machine for a long time at a very low speed.

According to my present invention, I provide a control system for governing two or more motors, as above indicated, in which the motors are operated successively as the machine is accelerated, but only one of which is employed after the device has once attained full speed, the low speed motor being inactive as the device is retarded. In addition to the foregoing, the system is so arranged that it may be governed by simple switching devices which may be located at any convenient points close to, or remote from, the machine.

The single figure of the accompanying drawing is a diagrammatic view showing the circuit connections of a control system embodying my invention.

Referring to the drawing, current is supplied from any suitable source of energy to electric motors 1 and 2, which are governed by a plurality of independently operated switches 3 to 16 inclusive, and a master controller 17, which is driven by a pilot motor 18.

The pilot motor is controlled from any one of a plurality of simple switching stations, such as 19 and 20, which may be located at any convenient point with reference to the machine which is operated by the motors 1 and 2.

The motor 1 is operatively connected to a shaft 21 by gears 22 and 23, which are so proportioned as to operate the shaft at a relatively high speed, the shaft being operatively connected, in any suitable manner, to a printing press or other machine (not shown).

The motor 2 is connected to a shaft 24 by a pinion 25 and a gear wheel 26, the arrangement of parts being such that normal operation of the motor causes the shaft to operate at a relatively low speed.

The shafts 21 and 24 are in substantial alinement and are adapted to be clutched together by a clutch 27. The clutch 27 comprises a flange or enlargement 28 on one end of the shaft 24, a similar flange or plate 29 of non-magnetizable material on the end of the shaft 21, a plurality of electro-magnets 30 having core members 31 which are arranged parallel to the center line of the shaft and extend through the plate 29 so that they engage the adjacent surface of the plate 28 when the electromagnets are energized and the two plates are drawn together.

The magnet coils 30 are electrically connected in any suitable relation and their terminals are connected to collector rings 32 and 33 which are mounted on the shaft 21 and are insulated therefrom in the usual manner.

The switches 3 to 16 inclusive are operated directly by electro-magnets but it is evident that other types of independently operated switches may be employed within the scope of my invention.

The master controller 17 comprises a rotatable arm 34 which is adapted to engage a plurality of contact ring segments 35, 36, 37, 38, 39, 40 and 41, a series of stationary field-resistance contact terminals 42 and a series of armature-resistance contact terminals 43 to 51 inclusive. The master switch is provided with limit switches 52 and 53 which interrupt the circuit of the pilot motor 18 at the extreme positions of the master switch. The motor 18 comprises an armature 54 and a field magnet winding 55, which is divided in order to facilitate reversing the motor, and an auxiliary resistance 56 which is connected across the armature terminals and may be adjusted to produce the desired motor speed.

The operation of, and the circuit connections for, the system are as follows: Assuming that the master switch 17 occupies the position shown in the drawing, if the switches 57 of the switching stations 19 and 20 are moved to occupy positions $b$, and if the line switch 59 is closed, an electric circuit will be established from positive line conductor 60 through switch 59, conductor 61, field magnet winding 62 of the motor 2, conductor 63 and conductors 69 and the switch 59 to the negative line conductor 65. A second circuit is established from the conductor 61 through conductor 66, ring segment 37 of the master switch 17, contact arm 34, conductor 67, the magnet winding of switch 6, conductor 68, switches 58 and 57 to negative conductor 69. It is apparent that the field magnet winding 62 of the motor 2 is energized and that the switch 6 will be closed by reason of the energizing of its electro-magnet. As soon as the switch 6 is closed, a control circuit is established from the positive line conductor 60, through conductor 70, a portion of the field magnet winding 55, conductor 71, limit switch 53, conductor 72, the switch 6, conductor 73, switch 74 (which is assumed to occupy the position $y$) conductor 75, armature 54 of the motor 18 and conductor 76 to negative conductor 69. It is therefore evident that the pilot motor 18 will be operated as soon as the switch 74 or the corresponding switch of the station 19 is moved to occupy the position $y$. The closing of the switch 6 completes another circuit from conductor 66, through a conductor 77 and its electro-magnet to the conductor 68, from which point the circuit is completed as above indicated. By this means, the switch 6 is made independent of the position of the master controller 17 and it will remain closed as the pilot motor is operated and the master switch advanced. The circuit connections for the pilot motor above traced are such as to produce counter-clockwise rotation of the arm 34 which first moves into engagement with ring segment 39 and afterward successively engages contacts 40, 43, 44 and 36. When the arm 34 engages the segment 39, a circuit is completed from conductor 66 through ring segments 37 and 39 to a switch 78, from which point two circuits are completed, one through conductor 79, collector ring 32 of the clutch 27, magnet windings 30, collector ring 33 and conductor 80 to negative line conductor 69. The other circuit is completed through conductor 82, magnet winding of switch 5 and conductor 83 to negative conductor 69. At this point, the magnetic clutch 27 is energized and the switch 5 is closed and, as the arm 34 moves into engagement with contacts 40, a circuit is completed through conductor 84 to the magnet winding of switch 8, circuit being completed through conductor 83 to negative conductor 69. A main circuit is now established from conductor 66 through switch 6, conductor 85, switch 5, conductor 86, the armature of the motor 2, conductor 87, armature resistance 88, switch 8, conductor 89 and switch 5 to negative conductor 69. At this point, therefore, the motor 2 is started with the resistance 88 included in the armature circuit. As the arm 34 successively engages contact members 43, 44 and 36, the switches 9, 10 and 11 are successively closed, and the resistance 88 is short-circuited until the motor armature is connected directly to the supply circuit. While the arm 34 is still in engagement with the contact 36, it moves into engagement with contact 45 so that a circuit is established from conductor 90, the magnet winding of switch 4 and conductor 91 to conductor 68, from which point circuit is completed through the switches 57 and 58, as already described. As soon as switch 4 is closed, a holding circuit is established from conductor 66, through switch 6, switch 4 and its electro-magnet to conductor 91. The switch 4 is now held closed independently of the position of the arm 34 and a main circuit is established from conductor 66, through switch 6 and switch 4, conductor 92, armature of motor 1, conductor 93, resistance 94 and switch 12 (which is closed upon the engagement of the arm 34 with contact 46) to the negative line conductor 69. At this point, it is evident that both the motor 2 and the motor 1 are connected to the supply circuit, the resistance 94 being included in the armature circuit of the motor 1. The field circuit for the motor 1 is completed from conductor 66, through contact segments 37 and 38 and conductor 95 to the field winding, the opposite terminal of which is connected to the negative conductor 69. The motors 1 and 2 and the ratios of the gears by means of which they are connected to the shafts 21 and 24 are such that the speeds of the shaft sections are substantially the same when the motors are both connected in circuit. As soon as the arm 34 becomes disengaged from the segment 39 and the segment 36, the clutch 27 will be deënergized and the switch 5 will be opened so that the motor 2 will be mechanically disconnected from the shaft 21 and its supply of energy will be interrupted. The shaft 21 and the machinery to which it is connected is now operated by the motor 1 and, as the arm 34 successively engages contact terminals 47, 48, 49, 50 and 51, switches 13, 14, 15, 16 and 7 are closed and the resistance 94 is gradually short-circuited. The motor speed will be gradually increased as the armature resistance is diminished and, as the arm 34 proceeds in the same direction into contact with ring segment 35 and successively engages contacts 42, the field strength of the motor will be diminished, the field resistance 96 being gradually included in the field circuit until the maximum speed of the motor is attained. At this point, the arm 34 will open the limit switch 53 and will, consequently, interrupt the circuit of the pilot motor and permit the master switch to come to rest. The limit switch 52 is so designed that it is closed as soon as it is released by the arm 34 and, consequently, if it is desired to decrease the speed of the device by moving the arm in the opposite direction, at any stage, the switch 74 may be moved to occupy the position $x$ in which the pilot motor circuit is established through the other section of its field in such a manner as to produce a reverse rotation of the motor and a clockwise rotation of the arm 34. If it is desired to run at a constant intermediate speed for any length of time, the switch 74 may be moved to an intermediate position, as shown in the drawings, in which the pilot motor will be entirely interrupted and the arm 34 will remain at rest.

From the foregoing, it is evident that a printing press may be started at a very low speed and efficiently operated as long as desired before its speed is increased or it may be automatically accelerated to relative high speed and afterward reduced to a lower speed. Those skilled in the art will understand that it is difficult to design a single motor for so wide a speed variation without sacrificing considerable efficiency for the lower speeds.

The system, as above described, will operate through the same steps in the reverse order in decreasing the speed of the machine if the switch 74 is moved to occupy the position $x$, but, for printing press operation, it is usually unnecessary to so adjust the machine as to operate on a very low speed after having operated at a high speed, although it is desirable, if not essential, to be able to carefully adjust the speed of the machine before the higher operating speeds are attained. In order to best fulfil these conditions, I provide a switch 78 which is operated by the projection 97 of the arm 34 when the arm moves into engagement with ring segment 38 just as the circuit of the motor 2 is interrupted. The switch is so arranged that the arm 98 is moved out of engagement with contact 99 and is thrown against a stop 100 by the spring 101 which is carried over the center of a finger 102, to which it is connected, by the action of the projection 97 against the finger 98, the two fingers 98 and 102 being joined by the link 103. When the arm 98 engages the stop 100, it is outside the range of the projection 97 and, consequently, it is impossible to close the switch 78 until the projection 97 engages finger 102 at the "off" position of the controller. It is therefore evident that the switch 78 does not enter into the operation of the master switch as the machine is accelerated, but, if the speed of the machine is decreased when it is driven only by the motor 1, the motor 2 is not again included in the circuit until the machine has been brought to rest and it is desired to again accelerate it.

At any stage in the operation of the machine, if it is desired to make a sudden stop or to interrupt the circuits of the motors, the switch 57 may be moved to occupy the position $a$. When this is done, the holding circuits for the switches 4 and 6 are interrupted, thereby permitting the switches to open and to interrupt the armature circuits of both motors. In addition to interrupting the motor armature circuits, the armature of the motor 1 is connected in circuit for regenerative braking, by the closure of the switch 3, which follows the energizing of its electro-magnet upon the completion of a circuit from one armature terminal of the motor 1 through conductor 104, switch 57, conductor 105, magnet switch 3 and conductor 92 to the opposite terminal. When this switch is closed, a resistance 106 is connected across the armature terminals of the motor.

As soon as the switch 6 is opened, the pilot motor connections are established for returning the arm 34 to its off position, the pilot motor being brought to rest by the limit switch 52 when this position is reached.

It is evident that the circuit connections of the system may be varied within the spirit and scope of my invention and I desire that no limitation shall be imposed which are not specified in the appended claims.

I claim as my invention:

1. In a control system, the combination with a plurality of electric driving motors, independently operated switches for controlling the motor circuits and a master switch for governing the operation of the switches, of a pilot motor for the master switch and remote means for controlling the operation of said pilot motor, said master switch being adapted to mechanically couple the driving motors together; to supply electrical energy to said motors successively; to disassociate the motors upon the application of energy to one of them and to govern the speed of both motors.

2. In a control system, the combination with a driven member, a motor operatively connected thereto, an auxiliary member, a second motor operatively connected to the auxiliary member and a clutch for coupling the members together, of electro-responsive means for actuating the clutch; accelerating said second motor; disassociating the members and accelerating the first named motor.

3. In a control system, the combination with a driven shaft, a motor operatively connected thereto for producing relatively high rotative speeds, an auxiliary shaft, a clutch for coupling the shafts together, a second motor operatively connected to the auxiliary shaft for producing relatively low speeds, of a plurality of independently operated switches for controlling the motors, a master switch for governing the switches and a clutch and a pilot motor for operating the master switch.

4. In a control system, the combination with a driven shaft, a motor operatively connected thereto for producing relatively high rotative speeds, an auxiliary shaft, a clutch for coupling the shafts, a second motor operatively connected to the auxiliary shaft for producing relatively low speeds, of a plurality of independently operated switches for controlling the motors, a master switch for governing the switches and a clutch, a pilot motor for actuating the master switch and a plurality of simple switching stations for controlling the action of the pilot motor.

5. In a control system, the combination with a driven member, two motors adapted to be successively accelerated to gradually increase the speed of the driven member, of electro-responsive means for electrically and mechanically disassociating one only of the motors from the system during the entire period of retardation of the driven member.

6. In a control system, the combination with a driven member, two motors adapted to be successively accelerated for gradually increasing the speed of the driven member, of means for governing the acceleration and retardation of the driven member and electro-responsive means for excluding one only of the motors during the entire period of retardation of the member.

7. In a control system, the combination with a driven shaft, a motor operatively connected thereto for producing relatively high rotative speeds, an auxiliary shaft, a clutch for coupling the shafts, a second motor operatively connected to the auxiliary shaft for producing relatively low speeds, of electro-responsive means for governing the acceleration of the driven shaft by successively accelerating the two motors and for governing the retardation of the driven shaft by means of one of the motors exclusively during the entire retardation period.

In testimony whereof, I have hereunto subscribed my name this 19th day of Jan., 1910.

JOHN H. KLINCK.

Witnesses:
D. S. BOWMAN,
B. B. HINES.

---

Copies of this patent may be obtained for five cents each, by addressing the "Commissioner of Patents, Washington, D. C."